J. G. BURNS.
PROCESS OF MAKING MEDICATED NEST EGGS.
APPLICATION FILED AUG. 2, 1916.

1,223,144.

Patented Apr. 17, 1917.

WITNESSES
Frank C. Palmer
C. Bradway

INVENTOR
J. G. Burns
BY
ATTORNEYS

UNITED STATES PATENT OFFICE.

JOHN GUIN BURNS, OF PULASKI, TENNESSEE, ASSIGNOR TO SOL COHN, SEYMOUR A. ISAACS, CECIL APPLEBY, AND THOMAS B. CARTER, ALL OF PULASKI, TENNESSEE.

PROCESS OF MAKING MEDICATED NEST-EGGS.

1,223,144.      Specification of Letters Patent.      Patented Apr. 17, 1917.

Application filed August 2, 1916. Serial No. 112,671.

*To all whom it may concern:*

Be it known that I, JOHN G. BURNS, a citizen of the United States, and a resident of Pulaski, in the county of Giles and State of Tennessee, have invented a new and Improved Process of Making Medicated Nest-Eggs, of which the following is a full, clear, and exact description.

This invention relates to a medicated nest egg of that type in which the agent for killing lice, mites, etc., is in liquid or semi-liquid form and sealed in the body of the egg and is adapted to pass out through the walls to the surface.

The invention has for its general objects to improve the construction of articles of this character so as to be comparatively inexpensive to manufacture, easily re-charged and so designed as to be serviceable for a long period of time.

Another object of the invention is to provide a novel, simple and inexpensive method of manufacturing a medicated egg having an inner chamber with capillary passages radiating therefrom and through which the liquid passes out to the surface.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a plan view of a mold in which the egg is formed;

Figure 1:
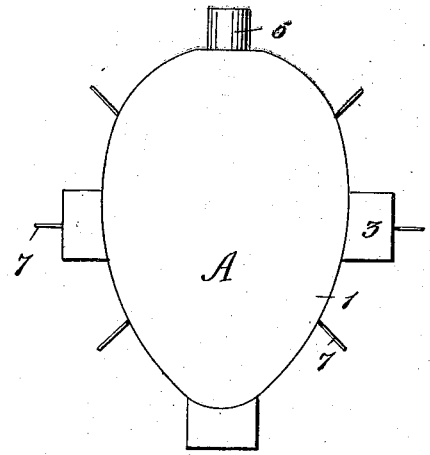
Figure 2:
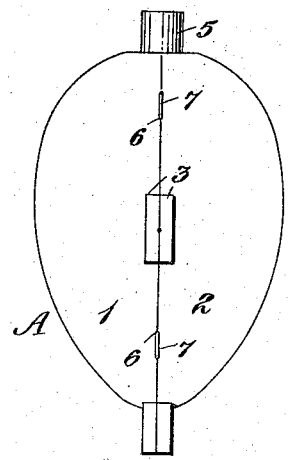
Fig. 2 is a side view thereof.

Referring to the drawing, A designates a mold in which is shaped the nest egg B. The mold is made in two mating sections 1 and 2 of similar construction, the inner surface being shaped so as to mold a mass of plaster of Paris and cement in plastic condition into the proper shape of an egg. The two sections 1 and 2 have lugs 3 to insure the proper mating of the sections. An opening is formed by recesses 4 in the sections so as to accommodate a former or plunger 5 whereby a chamber is produced in the center of the egg. The meeting surfaces of the two sections 1 and 2 have very shallow recesses 6, so that pliable metal wires 7 can be placed in these recesses and the mold closed, whereby the wires serve to produce passages 8 radiating at different angles from the chamber 9 of the egg. After the egg is molded and hardened it is charged through the open end 10 of the chamber 9, with a suitable liquid for killing lice, mites, etc., and after this chamber is filled it is sealed by a stopper 11. A gradual evaporation of the liquid 12 takes place through the capillary passages 8, and the fumes escaping serve to keep the fowls that rest on the eggs free from lice, mites, etc. To recharge the nest egg the stopper 11 is removed in any suitable manner and a fresh supply of liquid 12 is filled into the chamber, when the stopper is replaced. In order to prevent a too rapid flow of the liquid out of the small holes in the wall of the egg and insure a more gradual medication, a loose mass of cotton or a small amount of coarse sawdust is placed in the chamber so as to retain the liquid therein.

Figure 3:
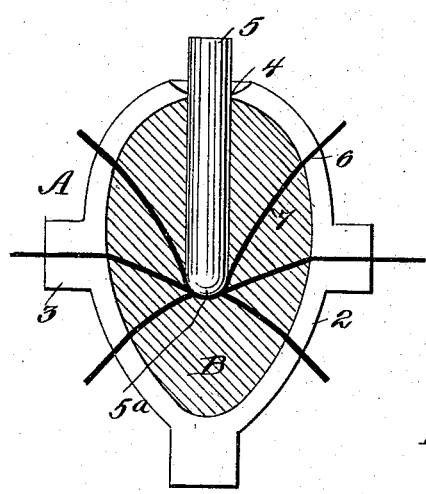
Fig. 3 is a sectional view on the line 3—3, Fig. 2, showing the molded egg in section but before the plunger and passage-forming wires are removed.
Figure 4:
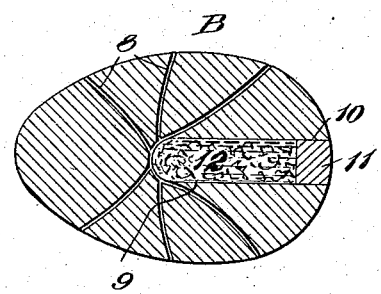
Fig. 4 is a vertical section of the charged nest egg.
Figure 5:
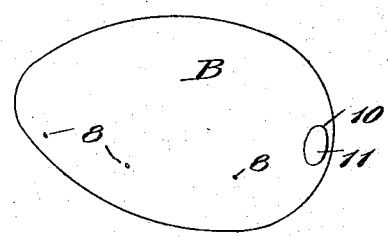
Fig. 5 is a perspective view of the finished article.

In making the egg, a plastic composition of plaster of Paris and cement or equivalent is mixed and a suitable quantity to fill one-half of the mold is placed in each section. The wires 7, which are normally straight, are placed on one of the sections and engaged in the recesses 6, the wires crossing at a point passing through the major axis of the mold. The other section is then placed on top of the one on which the wires rest. The two sections are thus firmly held together and the plunger 5 is inserted into the opening of the mold and forced about two-thirds into the latter. The plunger has a rounded inner end 5$^a$ which engages the wires 7 and bends the same, as shown in Fig. 3. The plastic material is allowed to set, and when sufficiently hard the wires, which are very pliable, are pulled longitudinally out of the egg. After the egg has been allowed to set for twenty-four hours, more or less, it is charged with liquid, as explained.

From the foregoing description taken in connection with the accompanying drawing, the advantages of the construction and method of operation will be readily understood by those skilled in the art to which the invention appertains, and while I have described the principle of operation, together with the article which I now consider to be the best embodiment thereof, I desire to have it understood that the article shown is merely illustrative and that such changes may be made when desired as fall within the scope of the appended claims.

Having thus described my invention, I claim as new and desire to secure by Letters Patent:

1. The process of making nest eggs, which consists in shaping two halves of the egg in separate mold sections, arranging flexible wires in crossing relation on one of the sections, bringing the sections together, inserting a chamber-molding plunger into the mold to a point beyond the crossing of the wires, whereby the latter are bent around the advancing plunger, removing the plunger, whereby a chamber is left in the body of the molded egg, and pulling the wires out of the egg to leave capillary passages.

2. The process of making a nest egg, which consists in molding in the body of the egg while plastic, a plurality of crossing wires, forcing a plunger into the body of the egg while plastic, to a point beyond the crossing of the wires, whereby the latter are deformed by the plunger, removing the plunger, whereby a chamber is left in the body of the egg, and longitudinally pulling the wires out of the body of the egg, whereby each wire leaves passages extending from opposite sides of the chamber to the surface of the egg.

JOHN GUIN BURNS.

Witnesses:
  STEWART WILKES,
  SOLOMON COHN.

Copies of this patent may be obtained for five cents each, by addressing the "Commissioner of Patents, Washington, D. C."